Oct. 29, 1963  R. N. HAYNIE ETAL  3,108,815
PROJECTION WELDED UNITIZED SEALS
Filed April 3, 1961  2 Sheets-Sheet 1

Oct. 29, 1963 R. N. HAYNIE ETAL 3,108,815
PROJECTION WELDED UNITIZED SEALS
Filed April 3, 1961 2 Sheets-Sheet 2
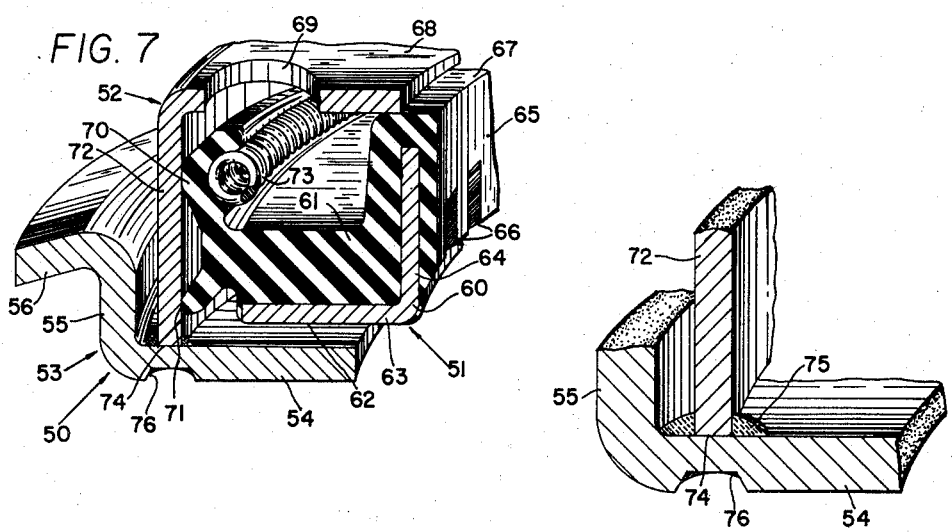
FIG. 7
FIG. 8
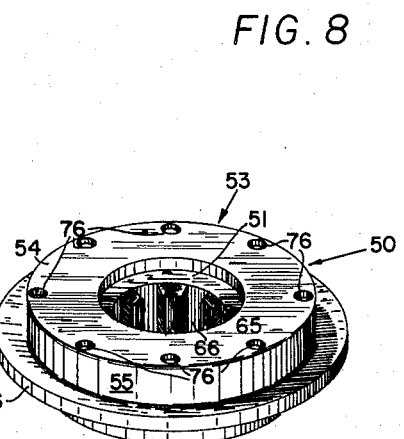
FIG. 5
FIG. 6
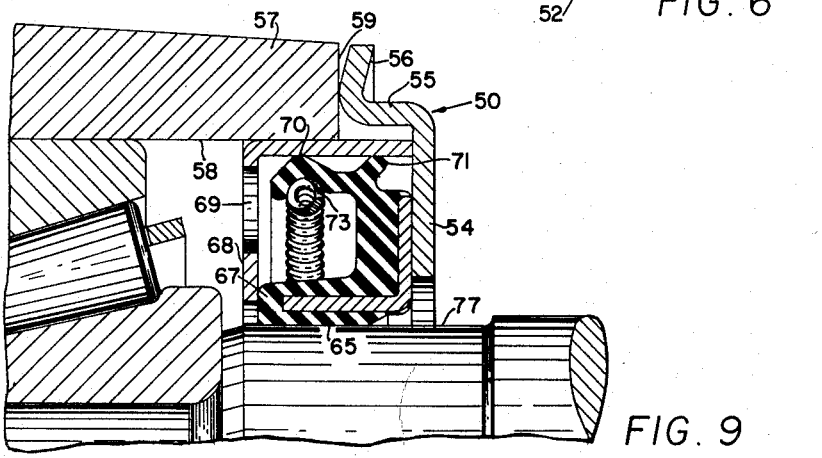
FIG. 9

United States Patent Office 3,108,815
Patented Oct. 29, 1963

3,108,815
PROJECTION WELDED UNITIZED SEALS
Robert N. Haynie, Mountain View, and Arthur M. Scott, Redwood City, Calif., assignors to Federal-Mogul-Bower Bearings, Inc., Detroit, Mich., a corporation of Michigan
Filed Apr. 3, 1961, Ser. No. 100,041
11 Claims. (Cl. 277—37)

This invention relates to an improved unitized seal.

By the term "unitized seal" is meant a radial shaft seal having a non-detachable wear ring on which the sealing element runs instead of running on the shaft or bore. The idea of a unitized seal has had considerable acceptance since it was first proposed a few years ago, because the rough surfaces of shafts or bores have worn their sealing elements and because shaft seals have tended to wear grooves in the shafts or bores. By incorporating a good wear surface into the seal assembly and making them one unitized assembly, it has been possible to increase both seal life and shaft life. Moreover, the installation procedure has been simplified, and alignment between the wear ring and the sealing element has been assured.

The chief problem in unitized seals so far has been that of expense, because necessarily the provision of the wear ring and its incorporation into the assembly have meant a more expensive product than a simple radial shaft seal. There have also been problems in manufacturing unitized seals economically.

Another problem met with unitized seals has been to provide unitized means for locating them in a given position. Shaft seals, heretofore, have often been made with cases which have projections or flanges that aided in locating them at a desired position in a bore by the engagement of this projection or flange with some exterior member, such as the end wall of the member having the bore. However, with untized seals it has often been somewhat difficult to provide such projections and it has also increased the expense of manufacture.

An important object of the present invention is to provide an improved inexpensively produced unitized seal.

Another important object of the invention is to provide a unitized seal having a locating projection extending therefrom, yet producing the unitized assembly at low cost.

Another object of the invention is to provide an improved form of unitized seal for installation between a shaft and a bore.

Another object of the invention is to provide an improved external type of unitized seal.

Other objects and advantages of the invention will appear from the following description of some preferred embodiments.

In the drawings:

FIG. 5 is a view in perspective of a modified form of unitized shaft seal embodying the principles of the invention.

FIG. 6 is a view in perspective of the seal of FIG. 5 with the seal inverted relative to FIG. 5.

FIG. 7 is a fragmentary enlarged view in perspective and in section of a portion of the seal of FIG. 5 taken along the line 7—7 in FIG. 5.

FIG. 8 is an enlarged fragmentary view of a portion of FIG. 7 in the vicinity of a projection weld.

FIG. 9 is a view in elevation and in section of the seal of FIG. 5 installed between a shaft and a bore in a tapered roller bearing installation.

Figure 2:
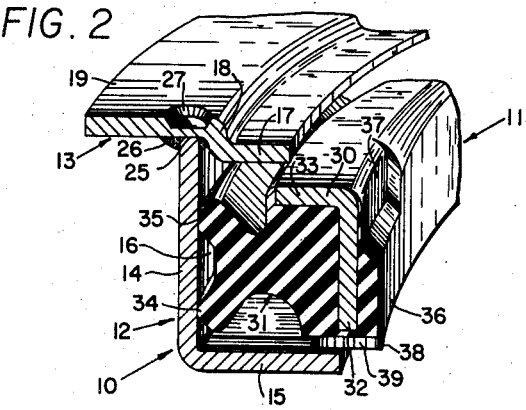
FIG. 2 is an enlarged fragmentary view in perspective and in section of a portion of the unitized seal of FIG. 1 taken along the line 2—2 in FIG. 1.
Figure 3:
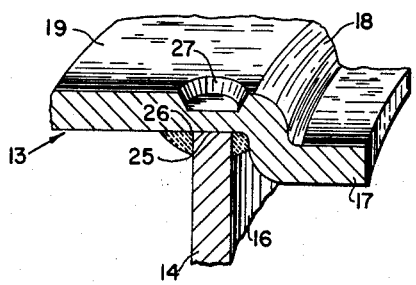
FIG. 3 is a further enlarged fragmentary view in perspective showing how projection welding is used in assembling the unitized seal of FIGS. 1 and 2.
Figure 1:
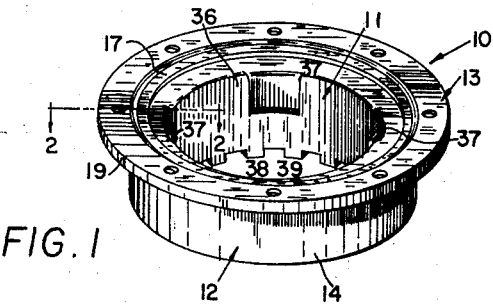
FIG. 1 is a view in perspective of a unitized seal embodying the principles of the invention.

FIGS. 1 thru 4 show a unitized shaft seal assembly 10 embodying the principles of the invention and comprising, as completed, a sealing assembly 11, a wear ring member 12, and a stop and locating member 13 which is projection welded to the wear ring member 12.

The wear ring member 12 comprises a flanged ring having an axially extending cylindrical portion 14 and a radially extending portion 15. The member 12 is preferably formed of sheet steel of a type which provides a very good running surface for an elastomer sealing element; in fact, a highly superior surface 16 is provided by forming the member 12 as shown, for then the wear surface 16 is protected during forming so that it is not necessary to polish, buff or grind it. Indeed, it is far preferable not to do any of these things because the surface 16 as prepared is better than it would be if polished, buffed, or ground, so far as good sealing action of the sealing element is concerned.

Figure 4:
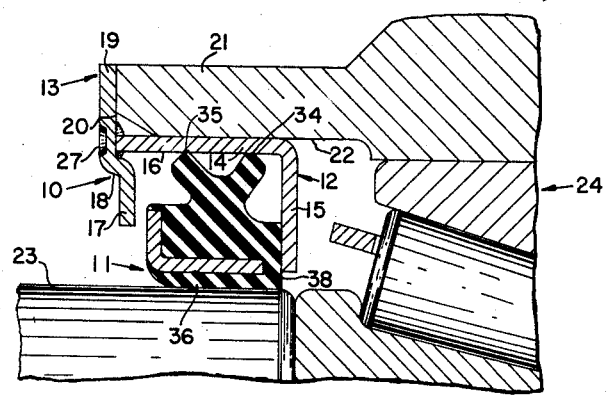
FIG. 4 is a fragmentary view in elevation and in section of the unitized seal of FIG. 1 installed between a shaft and a bore in a tapered roller bearing installation.

It will be noted that the radial flange 15 provides one of the axial stops restricting the axial movement of the sealing element 11 and therefore unitizing the seal 10. The other stop element completing this unitization is provided by a radially inner portion 17 of the member 13, which in the particular formation shown is bent with an axial offset 18 from an outer radial portion 19. The portion 19 projects radially out beyond the member 14, and as shown in FIG. 4 is used to engage the end wall 20 of a housing member 21 in which a bore 22 lies, while the sealing element 11 engages a shaft 23. Thus the locating portion 19 positively locates the unitized seal 10 relative to a tapered roller bearing 24.

A feature of this invention is that the member 13 is secured to the member 12 by projection welding an edge 25 of the member 12 to a series of projections 26 on the member 13. These projections 26 may be formed by forcing in dimples 27 from the opposite side if desired. In the weld, no weld rods are used, but the edge 25 is pushed against the projections 26 and current is sent through the metal members 12 and 13 and, being concentrated at the projections 26, softens them. Since the edge 25 is being pushed, when the projections 26 become fluid enough, the edge 25 is embedded in the projections 26 and moves in until the edge 25 bottoms against the portion 19. Then the current is no longer concentrated but is spread out over the entire area that is in contact with the edge 25; so the projections 26 cool and freeze and the weld is completed. This method is very effective in making this seal and has the advantage that the sealing element is not damaged by heat, due to the concentration of the heat on the projections 26.

The sealing element 11 comprises a metal reinforcing member 30 and an elastomeric member 31 bonded to the metal member 30. The metal member 30 has a cylindrical axially extending portion 32 and a radial flange 33. The elastomeric member 31 is bonded to the metal member and practically covers it, only the outer surface of the radial flange 33 not being purposely covered, and here flash does no harm. The elastomeric member 31 is in this instance provided with a pair of lips 34, 35, one lip 34 serving to retain the bearing lubricant and the other lip 35 serving to exclude another lubricant or foreign matter from the bearing 24. In the instance of the installation shown in FIG. 4, foreign matter is excluded by the lip 35, such foreign matter usually being thought of as dust, dirt, water and other elements which, if they got to the bearing 24, would tend to damage it. The use of dual-lips is an expedient which enables the sealing lip edges to point out in opposite directions for maximum lubricant retention and maximum foreign matter exclusion.

The elastomeric member 31 also covers the inner periphery of the cylindrical member 32 to provide a rubber covering 36 enabling installation on the shaft 23 without damage to the shaft. The covering 36 is preferably provided with a series of spaced-apart axially extending recesses 37 which provide space for the elastomer to flow into and thus make installation much easier while still providing a very tight gripping of the shaft 23 by the sealing member 11. Beyond the free edge of the cylindrical-extending portion 31 of the metal member 30, the elastomeric member 31 is provided with a plurality of projecting members or chaplets 38 between which are spaces 39 that permit passage of the lubricant to keep the lip 34 lubricated.

The seal 10 is made into a unit by first placing the sealing assembly 11 into the wear sleeve member 12 and then projection welding the wear sleeve member 12 to the member 13. In installation, the unitized seal 10 is pushed into the bore 22 until the member 19 engages the wall 20. Then the shaft 23 is pushed into the member 11. In this position the sealing member 11 is fixed to the shaft 23 and rotates with it, while the members 12 and 13 remain stationary relative to the bore 22.

Another form of unitized seal 50 is shown in FIGS. 5 thru 9. The seal 50 is similar in many respects to the seal 10 already discussed but has some interesting differences which illustrate how the principle can be applied in a different way. Once again, there is a sealing assembly 51, a wear sleeve member 52, and a spacing and locking member 53 which is projection welded to the wear sleeve member 52. In this instance, the projection welding is done in the same manner as before, but the member 53 is shown as formed somewhat differently, having a radially inner seal stop portion 54, an axial offset portion 55, radially outside the wear sleeve 52, and a stop portion 56 bent out at an angle therefrom. This enables installation as shown in FIG. 9 in which the sealing element 51 actually lies partly outside the bearing housing 57, the wear sleeve 52 being seated far enough into the bore 58 so that an adequate attachment is maintained, the member 56 engaging the end wall 59 of the housing, while the wear sleeve 52 extends far enough so that the auxiliary dust sealing lip 71 actually lies outside the bore 58, but still can be provided without having to rebuild the housing 57.

The sealing element 51 in this instance includes a metal case 60 and an elastomeric member 61, which covers most of the case 60 except the axially outer face 62 of a radial flange 63. The case 60 has a cylindrical portion 64 that is rubber covered on both sides, including an inner peripheral covering 65 adapted to engage the shaft. Again, there are recessed portions 66 in the covering 65, which in this instance are shown as rather rectangular portions extending axially.

It will be noted that in this instance the elastomeric portion 67 covering the free edge of the portion 64 is not provided with projecting members or chaplets; instead, the wear ring member's radial flange 68 is provided with a series of openings 69 through which lubricant can pass. This gives lubricant access to the sealing lip 70.

Again, two sealing lips 70 and 71 are shown, the lip 70 being urged into contact with the wear sleeve cylindrical flange 72 by a spring 73. On the lubricant-retaining lip 70, the spring 73 enables application of a force that counteracts the force of the lubricant tending to cause leakage. No spring is needed for the dust sealing lip 71, which is mounted as shown and is made from the same integral piece of elastomer 61.

Installation and assembly are the same substantially as in the other seal 10; the seal 50 is assembled by putting the sealing element 51 into the wear element 52 and then welding the edge 74 of the wear sleeve 52 into projections 75 formed by dimples 76 in the third element 53. Installation is made by pushing the metal wear sleeve 52 into the bore 58. In this instance it will be seen that it does not fully go into the bore 58 but is stopped by the portion 56 engaging the wall 59 so that the dust sealing lip 71 rides outside the housing member 57 but still rides on the wear sleeve 52, so that sealing is assured. Then the shaft 77 is inserted into the gripping portion 65 so that the sealing element 51 moves with the shaft 77, while the wear sleeve 52 and member 53 stay as a unit with the bore 58.

To those skilled in the art to which this invention relates, many additional changes in construction and widely differing embodiments of the invention will suggest themselves without departing from the spirit and scope of the invention as defined in the claims.

What is claimed is:

1. A unitized shaft seal, including in combination an annular metal wear sleeve with a cylindrical portion having a free edge and an inner peripheral wear surface and an outer peripheral bore-engaging surface and having a generally radial flange meeting said cylindrical portion at a corner at the opposite end from said free edge and extending radially inwardly; a radial shaft seal unit having cylindrical shaft-gripping means at its inner periphery and lip means engaging said inner peripheral wear surface; and a generally radially extending end member having spaced-apart projections and projection welded to the free edge of said cylindrical portion of said wear sleeve said free edge being embedded in said spaced-apart projections, said end member having a portion extending radially inwardly therefrom so as to confine said seal unit between itself and said radial flange and extending radially outwardly to serve as a locating means limiting insertion into a bore.

2. A unitized shaft seal, including in combination an annular metal wear sleeve with a cylindrical portion having a free edge and an inner peripheral wear surface and an outer peripheral bore-engaging surface and having a generally radial flange meeting said cylindrical portion at a corner at the opposite end from said free edge and extending radially inwardly; a radial shaft seal unit having a cylindrical shaft-gripping portion at its inner periphery and lip means engaging said inner peripheral wear surface; and a generally radial end member having spaced-apart projections and projection welded to the free edge of said cylindrical portion of said wear sleeve said free edge being embedded in said spaced-apart projections, said end member extending radially inwardly so as to confine said seal unit between itself and said radial flange.

3. An unitized shaft seal, including in combination an annular metal wear sleeve with a cylindrical portion having a free edge and an inner peripheral wear surface and an outer peripheral bore-engaging surface and having a generally radial flange meeting said cylindrical portion at a corner at the opposite end from said free edge and extending radially inwardly; a radial shaft seal unit having a supporting case and an elastomeric member bonded to said case, said case having a cylindrical portion at its inner periphery and said elastomeric member providing a cover on the radially inner side of said inner periphery and lip means engaging said inner peripheral wear surface; and a generally radial end member having spaced-apart projections and projection welded to the free edge of said cylindrical portion of said wear sleeve said free edge being embedded in said spaced-apart projections, said end member extending radially inwardly so as to confine said seal unit between itself and said radial flange and extending radially outwardly to serve as locating means limiting insertion into a bore.

4. The seal of claim 3, wherein said elastomeric member provides a pair of sealing lips constituting said lip means and diverging from each other.

5. The seal of claim 4 wherein said lips diverge from each other at about 45°.

6. The seal of claim 3 wherein said radial flange is perforated to provide oil passage means.

7. The seal of claim 3 wherein said cover on said inner periphery has a plurality of axial recesses extending from one end thereof and part way only toward the other end to provide space into which elastomer can flow to accommodate tolerances.

8. The seal of claim 3 wherein said end member has its radially inner portion offset axially from its radially outer portion.

9. The seal of claim 3 wherein said end member includes projections on the axially inner surface, to which said wear sleeve is welded, formed by dimples pushed from the axially outer surface of said end member.

10. A method for making a unitized lip-type rotary shaft seal from (1) an annular metal wear sleeve with a relatively thin cylindrical portion having a free edge and an inner peripheral wear surface and an outer peripheral bore-engaging surface and having a generally radial flange meeting said cylindrical portion at a corner at the opposite end from said free edge and extending radially inwardly; (2) a radial shaft seal unit having a cylindrical shaft-gripping means at its inner periphery and lip means for rotary sealing contact with said inner peripheral wear surface; and (3) a generally radial end member comprising the steps of: forming axial projections on said end member at the same radius as said free edge of said wear sleeve, said axial projections being wider than said free edge, inserting said seal unit in said wear sleve with the lip means in rotary sealing contact with said inner wear surface, placing said end member with its projections abutting said free edge at loci spaced away from said free edge, passing electric current through said wear sleeve edge and said end member sufficient to soften said projections, while retaining the seal lip means exactly as inserted and pushing said wear sleeve toward said end member and into said projections until said free edge abuts the rest of said end member and a series of welds enclose said free edge on both sides thereof, thereby reducing the heating action of said current, and freezing said projections.

11. The product resulting from the method of claim 10.

References Cited in the file of this patent
UNITED STATES PATENTS

| | | |
|---|---|---|
| 2,166,293 | Heinze | July 18, 1939 |
| 2,222,389 | Zimmer | Nov. 19, 1940 |
| 2,462,199 | Kehoe et al. | Feb. 22, 1949 |
| 2,625,450 | Ringsmith | Jan. 13, 1953 |
| 2,938,744 | Fritch | May 31, 1960 |
| 3,021,161 | Rhoads et al. | Feb. 13, 1962 |
| 3,022,081 | Kosatka | Feb. 20, 1962 |